United States Patent [19]

Seger et al.

[11] 4,198,132
[45] Apr. 15, 1980

[54] CONTACT LENS

[75] Inventors: Ronald G. Seger; Wayne E. Trombley; Lawrence R. Jacobson, all of Midland, Mich.

[73] Assignee: Dow Corning Corporation, Midland, Mich.

[21] Appl. No.: 969,618

[22] Filed: Dec. 14, 1978

[51] Int. Cl.² ............................................. G02C 7/04
[52] U.S. Cl. ............................ 351/160 R; 351/160 H
[58] Field of Search ................. 351/40, 160 R, 160 H, 351/161

[56] References Cited

U.S. PATENT DOCUMENTS

| 1,921,972 | 8/1933 | Fartsch | 351/160 |
| 4,084,890 | 4/1978 | Baron | 351/160 |
| 4,126,138 | 11/1978 | Isan | 351/160 R |

FOREIGN PATENT DOCUMENTS 1067732  5/1967  United Kingdom .................... 351/160

OTHER PUBLICATIONS

Bier and Lowther, *Contact Lens Correction*, (Buttersworths, London and Boston, 1977),pp.288-289.

*Primary Examiner*—John K. Corbin
*Assistant Examiner*—Scott J. Sugarman
*Attorney, Agent, or Firm*—Max J. Kenemore

[57] ABSTRACT

A contact lens of a preselected mass has an optical zone and at least one peripheral zone. The optical zone has a shape and thickness sufficient to result in a desired optical correction. At least one peripheral zone has a thickness selected to correspond with that of the optical zone so as to result in the lens having the preselected mass. In a preferred embodiment, the lens has an optical zone, an intermediate peripheral zone and an outer peripheral zone. The intermediate peripheral zone has a thickness which is varied to correspond with that of the optical zone and the outer peripheral zone has parallel carriers. The preferred embodiment may have an inner surface shaped so that the radius of curvature of the optical zone is substantially equal to that of the cornea at its optical centerline, the peripheral curves have centers of curvature offset from the centerline of the optical zone and the curves are tangent where they meet. Such an inner curve can result in tearfilm clearance from the edge of the lens to the center of the optical zone. The lens preferably has a low mass and is made from a silicone rubber. The invention includes a set of at least two such lenses having the same mass and diameter but differing optical correction.

7 Claims, 3 Drawing Figures

CONTACT LENS

BACKGROUND OF THE INVENTION

1. Field of the Invention

This invention relates generally to vision correction by spectacles and eyeglasses and, more specifically, to eye contact type ophthalmic lenses.

2. Description of the Prior Art

Contact lenses are well known in the art and have enjoyed commercial success for some time. Early disclosures of contact lenses are typified by U.S. Pat. Nos. 722,059 and 1,869,366 which describe scleral lenses made of glass. U.S. Pat. Nos. Re. 25,286 and Re. 29,229 are exemplary of disclosures relating to corneal contact lenses.

Much effort has been directed to improving the performance and the physical comfort of contact lenses. Improvements generally relate to materials and lens shape.

The use of silica filled siloxane elastomers as lens materials has been proposed (U.S. Pat. No. 3,228,741). Such elastomers, commonly known as silicone rubbers, are desirable contact lens materials because of their oxygen permeability and their well known bio-compatability. However, the difficulties of designing a satisfactory lens from a silicone rubber material are well known. Silicone rubber has a high modulus of elasticity causing lenses made from silicone rubber to tend to adhere or to "suction" to the eye upon blinking. This phenomenon is often referred to as the "suction cup effect."

Many lens designs have been proposed for use with both silicone rubber and other materials. Scleral contact lenses which arch over the cornea and are supported by the sclera are known (U.S. Pat. Nos. 2,129,305; 2,129,304; 2,178,873; 2,196,066; 2,438,743; 2,330,837; 3,781,096 and 3,937,566).

A scleral lens having an inner surface formed from two spherical sections with each section having a different radius of curvature and spherical center has been disclosed (U.S. Pat. No. 1,921,972). According to that disclosure the sharp edge where the two sections meet is smoothed by forming a third cut which can have an infinite radius of curvature, i.e., a conical section. This design does not take into consideration the topography of the individual eyeball and, as a result, does not achieve either uniform tearfilm clearance or uniform pressure of the lens against the eye at all points from the edge of the lens to the center of the optical zone.

Flush fitting semi-scleral contact lenses which are in total contact with the cornea and incapable of easy movement relative to the cornea have been disclosed (U.S. Pat. No. Re. 29,229).

The same publication also discloses semi-scleral lenses which arch over the cornea. Such lenses are often given to excessive movement on the eye due to gravity and eyelid drag. Such movement is commonly referred to as lag and causes variable vision on blinking. Variable vision can be distracting when it is excessive.

A lens design which includes a central portion of the lens resting on the cornea and a supporting flange or border resting on the scleral portion of the eye is also known. Such a design is known to be difficult to fit accurately, and it is observed that the flange may seal off the corneal area from the flow of eye fluids. A proposed solution to this problem (U.S. Pat. No. 2,510,438) is a corneal lens which contacts the central cornea and which has a slightly raised marginal portion.

A lens shape which is useful with a variety of materials is desirable. That is, a design which can be used with hard lens materials such as polymethylmethacrylate (PMMA) as well as soft materials such as hydratable gels, e.g. hydroxyethylmethacrylate (HEMA) and collagenous materials, and silicone rubbers would be useful.

The use of inner surface lens shapes which include offset and conical aspheric curves wherein the aspheric curve and the optical zone inner curve are tangent where they meet is also known (*Contact Lens Correction* by Bier and Lowther, Butterworths, London and Boston, 1977). An offset aspheric curve is one having a spherical center not on the centerline of the optical zone. A conical aspheric zone is one having an infinite radius of curvature. Such lens designs can result in uneven tearfilm clearance at various locations between the periphery of the lens and the center of its optical zone, especially when the lens is not shaped to match the topography of an individual eyeball.

Lenses which are shaped to take into consideration the topography of the individual eyeball are described in commonly assigned copending patent applications U.S. Ser. No. 919,651 filed June 28, 1978 and U.S. Ser. No. 945,728 filed Sept. 25, 1978. U.S. Ser. No. 919,651 describes semi-scleral lenses which have an optical zone shaped relative to an individual cornea and a conical peripheral zone which is tangent to the optical zone and which bridges the limbus.

U.S. Ser. No. 945,728 describes a lens in which the optical zone is shaped relative to an individual cornea and in which at least two peripheral zones have offset centers of curvature.

These lens designs provide a tearfilm clearance of improved uniformity and a reduced incidence of "suctioning." However, there remains a need for substantially complete tearfilm uniformity and a substantial absence of the "suctioning" phenomenon along with substantially uniform loading of the lens against the cornea.

Other significant problems exist in the manufacturing area. It is a notable problem that previously known lens designs usually have a peripheral zone which tapers in cross-section toward the outer edge of the lens. During manufacture, the lens is normally cut to the desired chordal diameter and then smoothed around its edge. The tapering cross-section often requires a different size edging tool for each increment in diameter. Such a requirement is both labor intensive and expensive.

It is a further manufacturing problem that some lens materials, such as silicone rubbers, which are used to form lenses by molding tend to change size, primarily by shrinking, after removal from the mold. Such shrinking can frustrate the most careful efforts to shape a lens to correspond to an individual eye topography.

Yet another manufacturing problem exists in that different lens corrective powers have different optical zone thicknesses and, therefore, different masses. The lens performance on the eye can vary with mass, and a different lens performance can be observed for lenses having the same diameter but different optical correction.

SUMMARY OF THE INVENTION

It is, therefore, an object of the invention to overcome the disadvantages of the prior art.

It is another object of the invention to avoid "suctioning" of an elastomeric contact lens to the eye.

It is also an object of the invention to achieve substantially uniform tearfilm clearance from the edge of a contact lens to the center of the optical zone.

It is an additional object of this invention to achieve substantially uniform loading of a contact lens against the surface of the cornea.

It is a further object of the invention to design a set of contact lenses having differing optical correction but substantially the same diameter and mass.

It is still another object of this invention to mold an elastomeric contact lens which at least substantially retains its molded shape.

It is yet a further object of the invention to edge contact lenses of various diameters with a single edging tool.

These and other objects are accomplished by a contact lens of a preselected mass which comprises, generally speaking, an optical zone shaped to result in a desired optical correction and at least one peripheral zone. The thickness of the peripheral zone is chosen to correspond with that of the optical zone in such a way that the preselected mass is achieved.

The contact lens may have an inner surface which has an optical zone back curve substantially equal to the radius of curvature of the cornea at its optical centerline. The peripheral curve (or curves) inner surfaces have centers of curvature offset from the centerline of the optical zone and are tangent to each other and to the optical zone. The inner surface of the lens is shaped relative to the eye to be fitted so that at least tearfilm clearance is achieved from the periphery of the lens to the center of the optical zone.

The lens may have an outer peripheral zone and an intermediate peripheral zone. The thickness of the intermediate peripheral zone is chosen to correspond with that of the optical zone to achieve the preselected mass, and the outer peripheral zone has parallel carriers (cross-sectional front and back edges).

In one embodiment the optical zone has a chordal diameter of about 7.6 mm, the intermediate peripheral zone has a chordal diameter of about 10 mm and a radius of curvature of about 13 mm, and the outer peripheral curve has a chordal diameter of about 12.5 mm and a radius of curvature of about 17 mm.

The lens may have an optical zone thickness of from about 0.05 mm to about 0.13 mm. The intermediate peripheral thickness can be from about 0.05 mm to about 0.16 mm and the thickness of the outer peripheral zone is about 0.1 mm between parallel carriers.

In a preferred embodiment the lens is made from a silicone rubber material and has a predetermined mass of about 0.1 g.

The invention includes a set of such lenses wherein each member of the set has an optical zone with a different corrective power but wherein the members of the set have substantially the same mass and diameter.

BRIEF DESCRIPTION OF THE DRAWINGS

The invention is described below with reference to the drawings in which.

DETAILED DESCRIPTION OF THE DRAWINGS

Figure 1A:
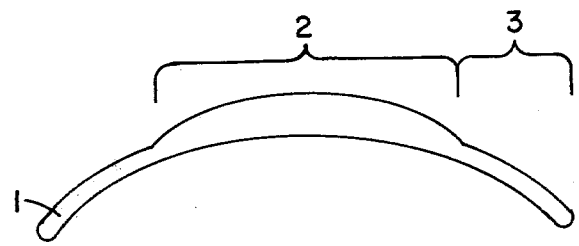
FIGS. 1a and 1b show schematically and in cross-section contact lenses according to the present invention. The shapes of the lenses in FIGS. 1a and 1b are greatly exaggerated for purposes of illustration.

Referring more specifically to FIG. 1a there is shown a contact lens 1 which has a preselected total mass. Lens 1 has an optical zone 2 and a peripheral zone 3. Optical zone 2 has a shape and thickness to provide the desired optical correction. Peripheral zone 3 extends from optical zone 2 to the edge of the lens.

Optical zone 2 has a thickness necessary to accomplish the desired optical correction. Peripheral zone 3 has a thickness which will result in lens 1 having the preselected mass. If optical zone 2 is thicker, peripheral zone 3 will be thinner, and visa versa, to achieve the same preselected mass.

Figure 1B:
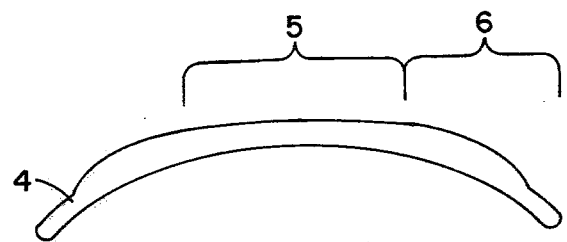

FIG. 1b also shows a contact lens according to the present invention. Lens 4 has optical zone 5 which is shaped to give a desired optical correction. Peripheral zone 6 extends from zone 5 to the edge of the lens. Zone 6 has a thickness which is sufficient to give lens 4 a preselected mass.

Lenses 1 and 4 may be members of a set wherein each lens has the same chordal diameter and the same preselected mass and wherein each lens has an optical zone which provides a different optical correction from other lenses in the set. Such a set is within the scope of the invention.

The ability to achieve a predetermined mass has been found to be important in controlling lens behavior on the eye and especially in obtaining consistent such behavior from lens to lens.

In the general embodiments of FIGS. 1a and 1b the contact lens may have any useful inner curves, any useful average thickness and can be made from any useful contact lens material. Suitable materials include glass, hard resins such as PMMA, collagenous materials or the silicone resin described in the commonly assigned copending applications U.S. Ser. No. 905,626, filed May 15, 1978; and resilient materials such as silicone rubbers, HEMA, collagenous materials and other hydratable gels. Silicone resins and rubbers and collagenous materials are preferred because of their oxygen permeability.

Figure 2:
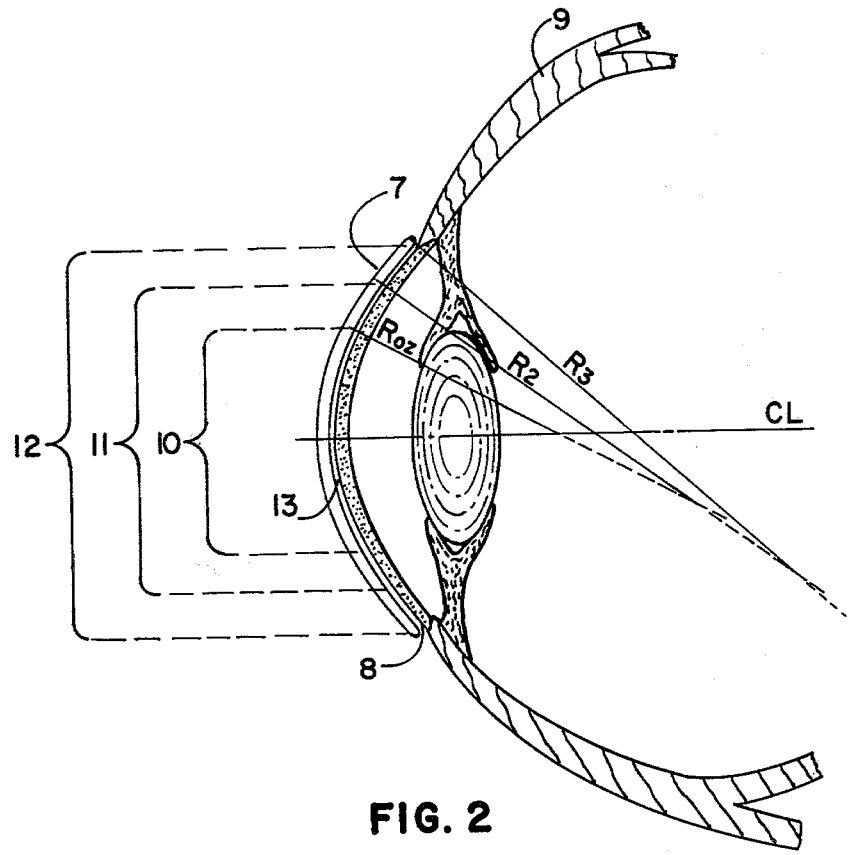
FIG. 2 shows schematically and in cross-section a preferred embodiment of a lens according to the present invention.

A preferred embodiment is shown in FIG. 2. Lens 7 rests on cornea 8 of eyeball 9.

Lens 7 has an optical zone 10, an intermediate peripheral zone 11 and an outer peripheral zone 12. Optical zone 10 has a thickness and shape sufficient to provide the desired optical correction. Outer peripheral zone 12 has a thickness of about 0.1 mm between parallel carriers. Intermediate zone 11 has a thickness coordinated with that of optical zone 10 so that lens 7 has a preselected mass.

The optical zone may have any thickness useful for achieving the desired optical correction. Typically, suitable optical zone thicknesses are between about 0.05 mm and about 0.13 mm. Both thinner and thicker lenses could be used but are not normally required to achieve vision correction.

Intermediate peripheral zone 11 typically has a thickness of from about 0.05 mm to about 0.16 mm. Such thicknesses are normally useful to correspond with the mass of optical zone 10 to achieve a preselected mass for lens 7.

Outer peripheral zone 12, in the preferred embodiment has parallel carriers (cross-sectional front and back edges) and a thickness of about 0.1 mm. It has been found that such a peripheral zone thickness is comfortable to the average lens wearer. The parallel carriers greatly ease the manufacture of lenses of various sizes.

In the manufacture of lenses, especially molded lenses, the lens form is cut and the cut edge is smoothed. When the peripheral zone has parallel carriers, one edging tool can be used for any size lens. In the past, the use of tapering peripheral zones required the use of different size edging tools for different lens diameters.

The total mass of the preferred embodiment of the lens is about 0.1 g. It has been found that such a mass necessitates a relatively thin lens. When material having a high modulous of elasticity such as silicone rubber is used as a lens material, the relatively thin lens has been surprisingly found to substantially avoid the "suction cup effect" which is normally expected with such materials.

In the preferred embodiment, a silicone material is selected for lens 7. When cornea 8 exhibits significant astigmatism, a silicone resin is selected; otherwise, a silicone rubber may be used.

In the preferred embodiment optical zone 10 has a chordal diameter of about 7.6 mm. The selection of such an optical zone diameter has been made as a manufacturing convenience. It is understood that the optical zone could be smaller or larger if individual circumstances dictate. It is an advantage of the relatively thin preferred embodiment that larger optical zones are possible.

The optical zone has an inner surface with a radius of curvature ($R_{OZ}$) substantially equal to that of the cornea at its optical centerline. The chordal diameters and the radii of curvature of the peripheral curves may be any useful measurement. In the preferred embodiment of lens 7 the chordal diameter of zone 11 is about 10 mm and the radius of curvature of that zone ($R_2$) is about 13 mm.

In lens 7, the spherical center radius of curvature of zone 11 is offset from the centerline (CL) of the optical zone 10 but is located on an extension of $R_{OZ}$. This results in zone 10 and zone 11 being tangent where they meet.

The preferred chordal diameter of zone 12 (and lens 7) is about 12.5 mm. The preferred radius of curvature for zone 12 ($R_3$) is about 17 mm. Zones 11 and 12 are tangent where they meet as are zones 10 and 11.

The preferred values for $R_2$ and $R_3$ and for the chordal diameters are chosen because they result in a lens inner surface 13 which has line-of-sight clearance from the edge of zone 10 to the edge of lens 7 relative to the average eyeball model. Surface 13 is also shaped to correspond to the topography of the individual cornea because $R_{OZ}$ relates directly to a measurement of the corneal shape.

Such a preferred design for surface 13 is observed to result in a substantially uniform tearfilm clearance of 0.025 to 0.030 mm on most eyes and in a corresponding uniform loading of the lens against the eye.

The present invention has been disclosed in the above teachings and drawings with sufficient clarity and conciseness to enable one skilled in the art to make and use the invention, to know the best mode for carrying out the invention and to distinguish it from other inventions and from what is old. Many variations and obvious adaptations of the invention will readily come to mind, and these are intended to be contained within the scope of the invention as claimed below.

What is claimed is:

1. A contact lens of a preselected mass comprising:
   (a) an optical zone shaped to result in a desired optical correction and
   (b) at least one peripheral zone the thickness of the peripheral zone being chosen to correspond with that of the optical zone in such a way that the preselected mass is achieved, and wherein the inner surface of the optical zone has a radius of curvature substantially equal to the radius of curvature of the cornea at its optical centerline, wherein the inner surface of each peripheral zone is an arc having a center of curvature offset from the optical centerline of the optical zone, each such center of curvature advancing around a circle which is the locus of center of curvature points, wherein the optical zone and each succeeding peripheral zone are tangent at their intersection, and wherein the inner surface of the lens is shaped relative to the eye to be fitted so that at least tearfilm clearance is achieved from the periphery to the center of the optical zone.

2. A contact lens of a preselected mass comprising:
   (a) an optical zone shaped to result in a desired optical correction,
   (b) an outer peripheral zone having parallel carriers,
   (c) an intermediate peripheral zone having a thickness chosen to correspond with that of the optical zone, and wherein
   (d) the thickness of the peripheral zones is chosen to correspond with that of the optical zone in such a way that the preselected mass is achieved.

3. The lens of claim 2 wherein the inner surface of the optical zone has a chordal diameter of about 7.6 mm, wherein the inner surface of the intermediate peripheral zone has a chordal diameter of about 10 mm and a radius of curvature of about 13 mm, and wherein the inner surface of the outer peripheral curve has a chordal diameter of about 12.5 mm and a radius of curvature of about 17 mm.

4. The lens of claim 2 wherein the optical zone has a thickness of from about 0.05 mm to about 0.13 mm, wherein the intermediate peripheral zone has a thickness of from about 0.05 mm to about 0.16 mm and wherein the thickness of the outer peripheral zone is about 0.1 mm.

5. The lens of claim 2 wherein the preselected mass is about 0.1 g.

6. The lens of claim 2 made from a silicone rubber material.

7. A set of at least two lenses each having a preselected mass wherein each member of the set has an optical zone with a different corrective power and which is shaped to result in a desired optical correction, and at least one peripheral zone, the thickness of the peripheral zone being chosen to correspond with that of the optical zone in such a way that the preselected mass is achieved, all members of the set having substantially the same mass and diameter.

* * * * *